(12) United States Patent
Kang et al.

(10) Patent No.: US 8,014,358 B2
(45) Date of Patent: *Sep. 6, 2011

(54) SYSTEM AND METHOD FOR NOTIFYING COMPLETION OF NETWORK RE-ENTRY PROCEDURE IN A COMMUNICATION SYSTEM

(75) Inventors: Hyun-Jeong Kang, Seoul (KR); Hyoung-Kyu Lim, Seoul (KR); Hong-Sung Chang, Suwon-si (KR); Pan-Yun Joo, Seoul (KR); Yeong-Moon Son, Anyang-si (KR); Mi-Hyun Lee, Seoul (KR); Sung-Jin Lee, Suwon-si (KR); Song-Nam Hong, Seoul (KR); Jung-Je Son, Seongnam-si (KR); Jae-Weon Cho, Suwon-si (KR); Young-Ho Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/701,285

(22) Filed: Feb. 5, 2010

(65) Prior Publication Data
US 2010/0144349 A1    Jun. 10, 2010

Related U.S. Application Data

(63) Continuation of application No. 11/481,488, filed on Jul. 6, 2006, now Pat. No. 7,724,706.

(30) Foreign Application Priority Data

Jul. 6, 2005    (KR) .................................. 2005-60944

(51) Int. Cl.
*H04W 4/00*    (2009.01)

(52) U.S. Cl. ........ 370/331; 370/328; 370/329; 370/330; 370/332; 455/436; 455/437; 455/438; 455/439; 455/440; 455/442; 455/443; 455/444; 455/450; 455/452.2

(58) Field of Classification Search .......... 455/436–444, 455/450, 451, 452.1, 452.2; 370/328, 329, 370/330, 331, 332, 333, 334
See application file for complete search history.

(56) References Cited

U.S. PATENT DOCUMENTS 6,195,550 B1    2/2001    Sollee et al.
(Continued)

FOREIGN PATENT DOCUMENTS

AU    199720484    2/1997
(Continued)

OTHER PUBLICATIONS

Part 16: Air Interface for Fixed and Mobile Broadband Wireless Access Systems; Amendment for Physical and Medium Access Control Layers for Combined Fixed and Mobile Operation in Licensed Bands; Draft IEEE Standard for Local and Metropolitan Area Networks; Dec. 2004.

(Continued)

*Primary Examiner* — Olumide T Ajibade Akonai
(74) *Attorney, Agent, or Firm* — The Farrell Law Firm, P.C.

(57) ABSTRACT

Provided is a method for receiving a notification indicating a completion of a network re-entry procedure by a Base Station (BS) in a communication system. The method includes transmitting, to a Mobile Station (MS), a RaNGing ReSPonse (RNG-RSP) message including information indicating whether to omit any of processes or transmission of messages for performing a network re-entry procedure with the BS; and receiving, from the MS, a notification indicating the completion of the network re-entry procedure.

8 Claims, 7 Drawing Sheets

U.S. PATENT DOCUMENTS

| | | | |
|---|---|---|---|
| 7,190,686 B1 | 3/2007 | Beals | |
| 7,305,240 B2 | 12/2007 | Chou et al. | |
| 7,369,856 B2 | 5/2008 | Ovadia | |
| 7,515,561 B2 * | 4/2009 | Koodli et al. | 370/331 |
| 7,519,367 B2 | 4/2009 | Igarashi et al. | |
| 7,818,006 B2 * | 10/2010 | Kim et al. | 455/436 |
| 2003/0092442 A1 | 5/2003 | Dalal et al. | |
| 2003/0153266 A1 | 8/2003 | Kim et al. | |
| 2003/0169697 A1 | 9/2003 | Suzuki et al. | |
| 2004/0103282 A1 | 5/2004 | Meirer et al. | |
| 2005/0025181 A1 | 2/2005 | Nazari | |
| 2005/0148330 A1 | 7/2005 | Alberth, Jr. et al. | |
| 2005/0197126 A1 | 9/2005 | Kang et al. | |
| 2005/0208945 A1 | 9/2005 | Hong et al. | |
| 2005/0272481 A1 | 12/2005 | Kim | |
| 2005/0277417 A1 | 12/2005 | Yoon et al. | |
| 2006/0009242 A1 * | 1/2006 | Ryu et al. | 455/458 |

FOREIGN PATENT DOCUMENTS

| | | |
|---|---|---|
| EP | 1 534 035 | 5/2005 |
| GB | 2 377 855 | 1/2003 |
| JP | 2003-087841 | 3/2003 |
| JP | 2004-312241 | 11/2004 |
| RU | 2003135644 | 5/2005 |
| TW | 223928 | 11/2004 |
| TW | 226160 | 1/2005 |
| WO | WO 01/37596 | 5/2001 |
| WO | WO 02/091786 | 11/2002 |
| WO | WO 03/061236 | 7/2003 |
| WO | WO 2004/040778 | 5/2004 |
| WO | WO 2005/025092 | 3/2005 |

OTHER PUBLICATIONS

Part 16: Air Interface for Fixed Broadband Wireless Access Systems, IEEE Standard for Local and Metropolitan area Networks, IEEE std 802.16, Oct. 1, 2004.

Lim et al., "Clarification of HO Process Optimization Field and its Usage", IEEE 802.16 Broadband Wireless Access Working Group, Jan. 25, 2005.

* cited by examiner

SYSTEM AND METHOD FOR NOTIFYING
COMPLETION OF NETWORK RE-ENTRY
PROCEDURE IN A COMMUNICATION
SYSTEM

PRIORITY

This application is a Continuation of U.S. Ser. No. 11/481,488, which was filed in the United States Patent and Trademark Office on Jul. 6, 2006 and claims priority under 35 U.S.C. §119(a) to an application entitled "System and Method for Notifying Completion of Network Re-entry Procedure in a Communication System" filed in the Korean Intellectual Property Office on Jul. 6, 2005 and assigned Serial No. 2005-60944, the entire contents of which are herein incorporated by reference.

BACKGROUND OF THE INVENTION

1. Field of the Invention

The present invention relates generally to a communication system, and in particular, to a system and method for notifying completion of a network re-entry procedure in a communication system.

2. Description of the Related Art

In the next generation communication system, active research is being conducted to provide the service capable of transmitting/receiving high-speed, high-capacity data to/from Mobile Stations (MSs). An Institute of Electrical and Electronics Engineers (IEEE) 802.16e communication system is a typical example of the next generation communication system.

With reference to FIG. 1, a description will now be made of a process of performing by an MS a network re-entry procedure with a target Base Station (BS) after performing connection switching, e.g., handover, from a serving BS to the target BS in a general IEEE 802.16e communication system.

FIG. 1 is a signaling diagram illustrating a process of performing a network re-entry procedure in a general IEEE 802.16e communication system.

Referring to FIG. 1, after handover from a serving BS to a target BS 150, an MS 100 acquires downlink synchronization with the target BS 150, and receives parameters to be used in an uplink and a downlink, in step 111. Thereafter, the MS 100 should acquire uplink synchronization by performing a ranging operation with the target BS 150, and perform an operation of adjusting transmission power. Therefore, the MS 100 sends a RaNGing REQuest (RNG-REQ) message to the target BS 150 in step 113, and the target BS 150 sends a RaNGing ReSPonse (RNG-RSP) message to the MS 100 in response to the RNG-REQ message in step 115.

After performing the ranging operation in this way, the MS 100 sends a Subscriber Station Basic Capability REQuest (SBC-REQ) message to the target BS 150 to request the basic capabilities of the target BS 150 and the MS 100 in step 117. The SBC-REQ message, which is a Medium Access Control (MAC) message the MS 100 sends to the target BS 150 to request the basic capabilities, includes therein information on a Modulation and Coding Scheme (MCS) level supportable by the MS 100. Upon receiving the SBC-REQ message from the MS 100, the target BS 150 detects an MCS level supportable by the MS 100, included in the received SBC-REQ message, and sends a Subscriber Station Basic Capability ReSPonse (SBC-RSP) message to the MS 100 in response to the SBC-REQ message in step 119.

Upon receipt of the SBC-RSP message, the MS 100 sends a Privacy Key Management REQuest (PKM-REQ) message to the target BS 150 for MS authentication and key exchange in step 121. The PKM-REQ message, a MAC message for MS authentication, includes a certificate (unique information) of the MS 100. Upon receipt of the PKM-REQ message, the target BS 150 performs authentication with an undepicted Authentication Server (AS) using the certificate of the MS 100, included in the received PKM-REQ message. If the MS 100 is an authenticated MS as a result of the authentication, the target BS 150 sends a Privacy Key Management ReSPonse (PKM-RSP) message to the MS 100 in response to the PKM-REQ message in step 123. The PKM-RSP message includes an Authentication Key (AK) and a Traffic Encryption Key (TEK) allocated to the MS 100.

Upon receipt of the PKM-RSP message, the MS 100 sends a Registration REQuest (REG-REQ) message to the target BS 150 in step 125. The REG-REQ message includes MS registration information for the MS 100. Upon receipt of the REG-REQ message, the target BS 150 detects MS registration information included in the received REG-REQ message, registers the MS 100 therein using the MS registration information, and sends a Registration ReSPonse (REG-RSP) message to the MS 100 in response to the REG-REQ message in step 127. The REG-RSP message includes the registered MS registration information. The MS 100 receives the REG-RSP message, completing its network re-entry procedure to the target BS 150 in step 129. As the MS 100 receives the REG-RSP message, a normal operation is performed between the MS 100 and the target BS 150, completing the network re-entry procedure.

The process of performing the network re-entry procedure in the general IEEE 802.16e communication system has been described so far with reference to FIG. 1. Next, with reference to FIG. 2, a description will be made of a process of performing a network en-entry procedure based on Handover Process Optimization Type/Length/Value (TLV) in a general IEEE 802.16e communication system.

FIG. 2 is a signaling diagram illustrating a process of performing a network en-entry procedure based on Handover Process Optimization TLV in a general IEEE 802.16e communication system.

Referring to FIG. 2, after handover from a serving BS to a target BS 250, an MS 200 acquires downlink synchronization with the target BS 250, and receives parameters to be used in an uplink and a downlink, in step 211. The MS 200 sends an RNG-REQ message to the target BS 250 in step 213, and the target BS 250 sends an RNG-RSP message to the MS 200 in response to the RNG-REQ message in step 215. The RNG-RSP message includes Handover (HO) Process Optimization TLV, and the HO Process Optimization TLV, an Information Element (IE) included using a TLV encoding scheme, is an IE of a connection switched MS, for example, a handover-processed MS, used for supporting a fast network re-entry procedure with the target BS. That is, the HO Process Optimization TLV is an IE written to make it possible to omit some or all of the message transmission/reception processes that should necessarily be performed in the general network re-entry procedure for the fast network re-entry procedure of the MS 200.

When the MS 200 performs general handover or idle mode handover, the target BS 250 can acquire information on the MS 200 via a backbone network from the system having the information on the MS 200, like an old serving BS or a paging controller, before the MS 200 performs the general handover or idle mode handover. The information on the MS 200 can be equal to the information acquired in the process of performing by the MS 200 the network re-entry procedure after its handover from the serving BS to the target BS 250. In this case, by acquiring the information on the MS 200 via the backbone network, the target BS 250 can omit a particular message transmission/reception process in the network re-entry procedure due to the handover of the MS 200, and can not only save the air link resources necessary for the particular message transmission/reception process but also advance a normal communication restart time with the MS 200. Therefore, the target BS 250 includes the HO Process Optimization TLV in order to send to the MS 200 a notification indicating the message transmission/reception process omittable in the process of performing the network re-entry procedure. A format of the HO Process Optimization TLV is shown in Table 1 below.

TABLE 1

| HO Process Optimization | For each Bit location, a value of '0' indicates the associated re-entry management message shall be required, a value of '1' indicates the re-entry management messages may be omitted. Bit #0: Omit SBC-REQ management message during current re-entry processing Bit #1: Omit PKM Authentication phase except TEK phase during current re-entry processing Bit #2: Omit PKM TEK creation phase during current re-entry processing Bit #3: BS shall send an unsolicited SBC-RSP management message with updated capabilities information in case capabilities of Target BS are different from the ones of Serving BS Bit #4: Omit REG-REQ management message during current re-entry processing Bit #5: BS shall send an unsolicited REG-RSP management message with updated capabilities information Bit #6: BS supports virtual SDU SN. If Bit#6 = 1 and MS supports SDU SN, it shall issue SN Report header upon completion of HO to this BS. |
|---|---|

In Table 1, the HO Process Optimization TLV is a kind of bitmap information indicating whether it is possible to omit transmission/reception of a message in the current network re-entry procedure. That is, the HO Process Optimization TLV IE is expressed in the form of, for example, a 7-bit bitmap, and each bit of the HO Process Optimization TLV bitmap will be described herein below.

(1) A first bit Bit#0 indicates whether it is possible to omit transmission of an SBC-REQ message. Bit#0=0 indicates that the MS 200 should necessarily transmit the SBC-REQ message, and Bit#0=1 indicates that the MS 200 can omit transmission of the SBC-REQ message.

(2) A second bit Bit#1 indicates whether it is possible to omit a PKM authentication process. Bit#1=0 indicates that the MS 200 should perform the PKM authentication process including a TEK process, and Bit#1=1 indicates that the MS 200 can omit the PKM authentication process except for the TEK process.

(3) A third bit Bit#2 indicates whether it is possible to omit the TEK process. Bit#2=0 indicates that the MS 200 should necessarily perform the TEK process, and Bit#2=1 indicates that the MS 200 can omit the TEK process.

(4) A fourth bit Bit#3 indicates whether it is possible to omit transmission of an SBC-RSP message. Bit#3=0 indicates that the target BS 250 should necessarily transmit an unsolicited SBC-RSP, and Bit#3=1 indicates that the target BS 250 can omit transmission of the SBC-RSP message by transmitting the information included in the SBC-RSP message along with the RNG-RSP message using the TLV encoding scheme.

(5) A fifth bit Bit#4 indicates whether it is possible to omit transmission of an REG-REQ message. Bit#4=0 indicates that the MS 200 should necessarily transmit the REG-REQ message, and Bit#4=1 indicates that the MS 200 can omit transmission of the REG-REQ message.

(6) A sixth bit Bit#5 indicates whether it is possible to omit transmission of a REG-RSP message. Bit#5=0 indicates that the target BS 250 should necessarily transmit an unsolicited REG-RSP, and Bit#5=1 indicates that the target BS 250 can omit transmission of the REG-RSP message by transmitting the information included in the REG-RSP message along with the RNG-RSP message using the TLV encoding scheme.

(7) A seventh bit Bit#6 indicates whether the target BS 250 supports a virtual Service Data Unit (SDU) Sequence Number (SN). Bit#6=0 indicates that the target BS 250 supports the virtual SDU SN, and if the Bit#6 is set to '1 ' and the MS 200 also supports the virtual SDU SN, the MS 200 should transmit an SN Report header to the target BS 250 after completing the network re-entry procedure with the target BS 250.

When each of Bit#3 and Bit#5 of the HO Processor Optimization TLV included in the RNG-RSP message is set to '1', the TLV included in the RNG-RSP message is shown in Table 2 below.

TABLE 2

| If(HO Process Optimization [bit #3] == 1) | |
|---|---|
| SBC-RSP encodings | SBC-RSP TLV items for HO optimization |
| If(HO Process Optimization [bit #5] == 1) | |
| REG-RSP encodings | REG-RSP TLV items for HO optimization |

In Table 2, if Bit#3 of the HO Process Optimization TLV is set to '1', it indicates SBC-RSP encoding information included in the RNG-RSP message. If Bit#5 of the HO Process Optimization TLV is set to '1', it indicates REG-RSP encoding information included in the RNG-RSP message.

Thereafter, the MS 200 and the target BS 250 perform the network re-entry procedure according to the HO Process Optimization TLV. For example, if the HO Process Optimization TLV bitmap is set to '1110100 ', the MS 200 omits transmission of an SBC-REQ message in step 217, the target BS 250 sends an unsolicited SBC-RSP message to the MS 200 in step 219, the MS 200 omits transmission of a PKM-REQ message in step 221, the target BS 250 omits transmission of a PKM-RSP message in step 223, the MS 200 omits transmission of an REG-REQ message in step 225, and finally, the target BS 250 sends an unsolicited REG-RSP message to the MS 200 in step 227.

As another example, if the HO Process Optimization TLV bitmap is set to '1111110 ', the target BS 250 should transmit the information include in the SBC-RSP message and the information included in the REG-RSP message along with the TLV of the RNG-RSP message. In this case, the MS 200 and the target BS 250 can normally complete the network re-entry procedure in step 229, even though they omit all the message transmission/reception processes shown in steps 217 to 227.

As described above, in the course of performing the network re-entry procedure, the MS and the target BS can omit some or all of the message transmission/reception processes in the network re-entry procedure according to the HO Process Optimization TLV.

However, even though the MS has failed to normally receive the RNG-RSP message from the target BS, it is impossible for the target BS to recognize the MS's failure to normally receive the RNG-RSP message. In this case, though the target BS performs the network re-entry procedure according to the HO Process Optimization TLV, the MS may perform the general network re-entry procedure, causing mis-synchronization of the message transmission/reception process between the MS and the target BS.

In addition, if the target BS transmits an unsolicited SBC-RSP message or unsolicited REG-RSP message together with the SBC-REQ message or REG-REQ message without a request of the MS, i.e., if the target BS unilaterally transmits the message to the MS without performing the general message transmission/reception process, it is impossible for the target BS to recognize whether the MS has normally received the unsolicited SBC-RSP message or unsolicited REG-RSP message.

Therefore, there is a need for a scheme in which while the MS and the target BS are performing the network re-entry procedure according to the HO Process Optimization TLV, the target BS can recognize whether the MS has normally received the unsolicited message that the target BS transmitted without the request of the MS, or the message included in the HO Process Optimization TLV.

SUMMARY OF THE INVENTION

It is, therefore, an object of the present invention to provide a system and method for notifying completion of a network re-entry procedure in a communication system.

It is another object of the present invention to provide a system and method for notifying normal receipt of particular messages in a network re-entry procedure in a communication system.

It is further another object of the present invention to provide a system and method for notifying normal receipt of an unsolicited message transmitted by a target BS in a network re-entry procedure in a communication system.

According to one aspect of the present invention, there is provided a system for receiving a notification indicating a completion of a network re-entry procedure in a communication system. The system comprises a Base Station (BS) for transmitting, to a Mobile Station (MS), a RaNGing ReSPonse (RNG-RSP) message including information indicating whether to omit any of processes or transmission of messages for performing a network re-entry procedure with the BS, and receiving, from the MS, a notification indicating the completion of the network re-entry procedure.

According to another aspect of the present invention, there is provided a method for receiving a notification indicating a completion of a network re-entry procedure by a Base Station (BS) in a communication system. The method comprises transmitting, to a Mobile Station (MS), a RaNGing ReSPonse (RNG-RSP) message including information indicating whether to omit any of processes or transmission of messages for performing a network re-entry procedure with the BS; and receiving, from the MS, a notification indicating the completion of the network re-entry procedure.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EMBODIMENTS

Embodiments of the present invention will now be described in detail with reference to the annexed drawings. In the following description, a detailed description of known functions and configurations incorporated herein has been omitted for clarity and conciseness.

The present invention proposes a system and method for notifying completion of a network re-entry procedure in a communication system, for example, an Institute of Electrical and Electronics Engineers (IEEE) 802.16e communication system. In addition, the present invention proposes a system and method for notifying whether a Mobile Station (MS) has normally received an unsolicited message transmitted by a target Base Station (BS) in the course of performing a network re-entry procedure according to Handover Process Optimization Type/Length/Value (TLV) in an IEEE 802.16e communication system. Although the present invention will be described with reference to the IEEE 802.16e communication system for convenience, the scheme proposed in the present invention can be applied even to other communication systems.

Figure 1:
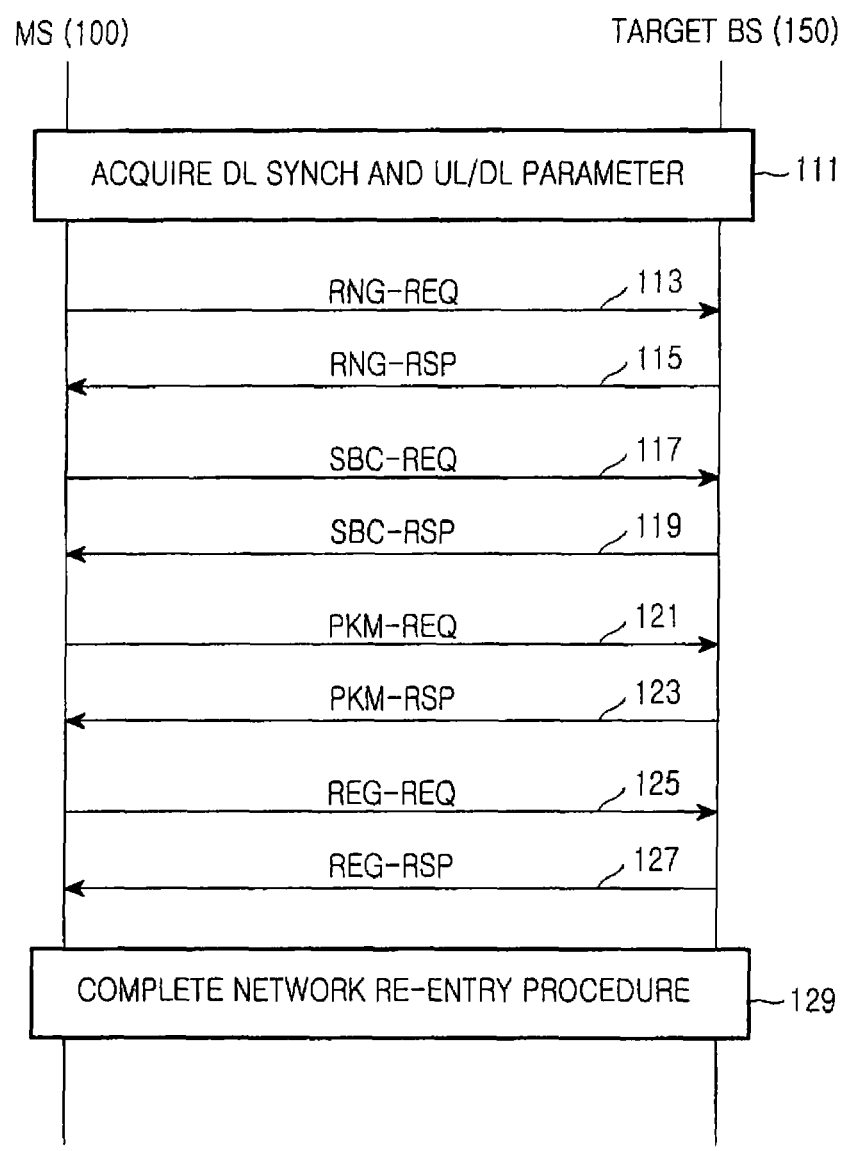
FIG. 1 is a signaling diagram illustrating a process of performing a network re-entry procedure in a general IEEE 802.16e communication system.
Figure 2:
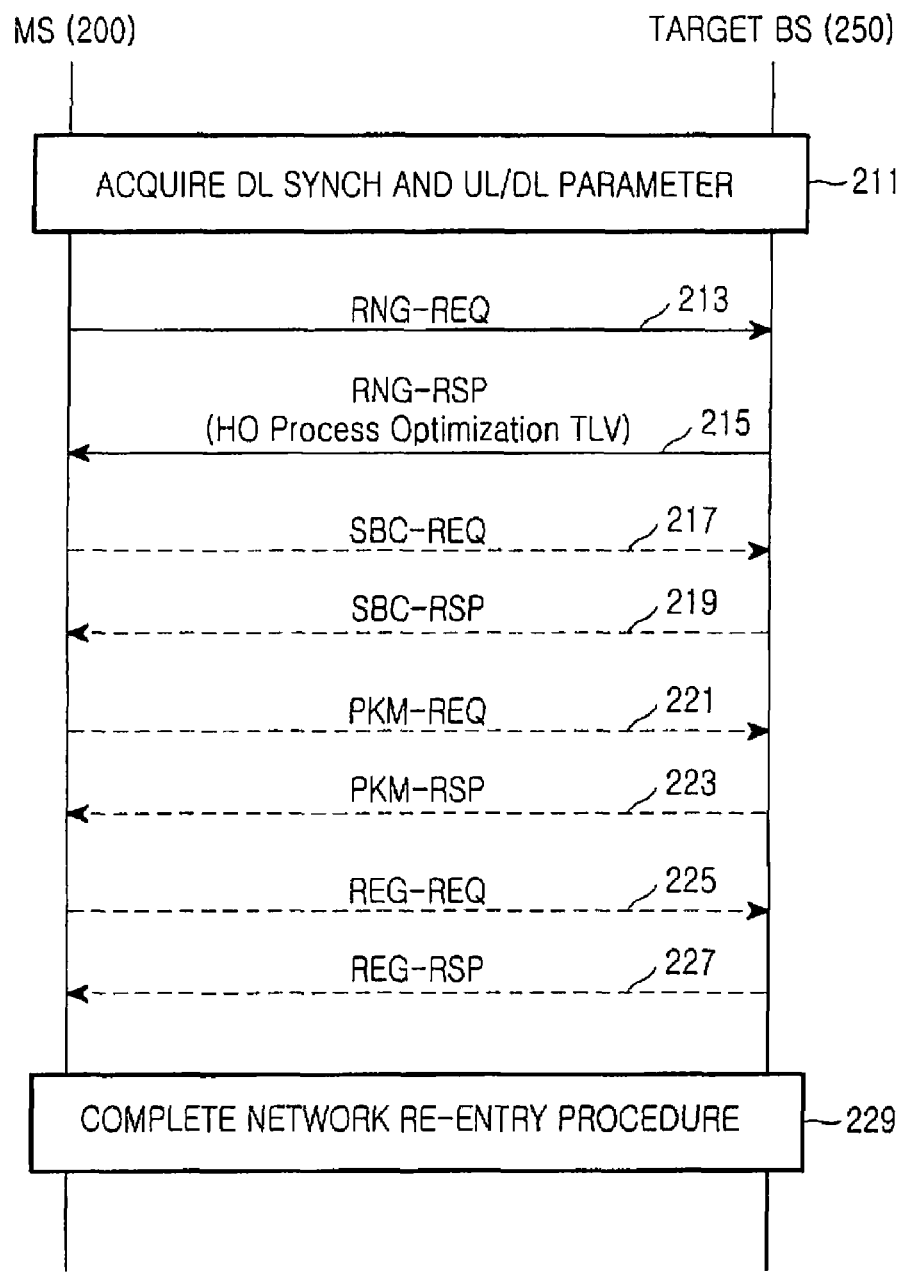
FIG. 2 is a signaling diagram illustrating a process of performing a network en-entry procedure based on Handover Process Optimization TLV in a general IEEE 802.16e communication system.
Figure 3:
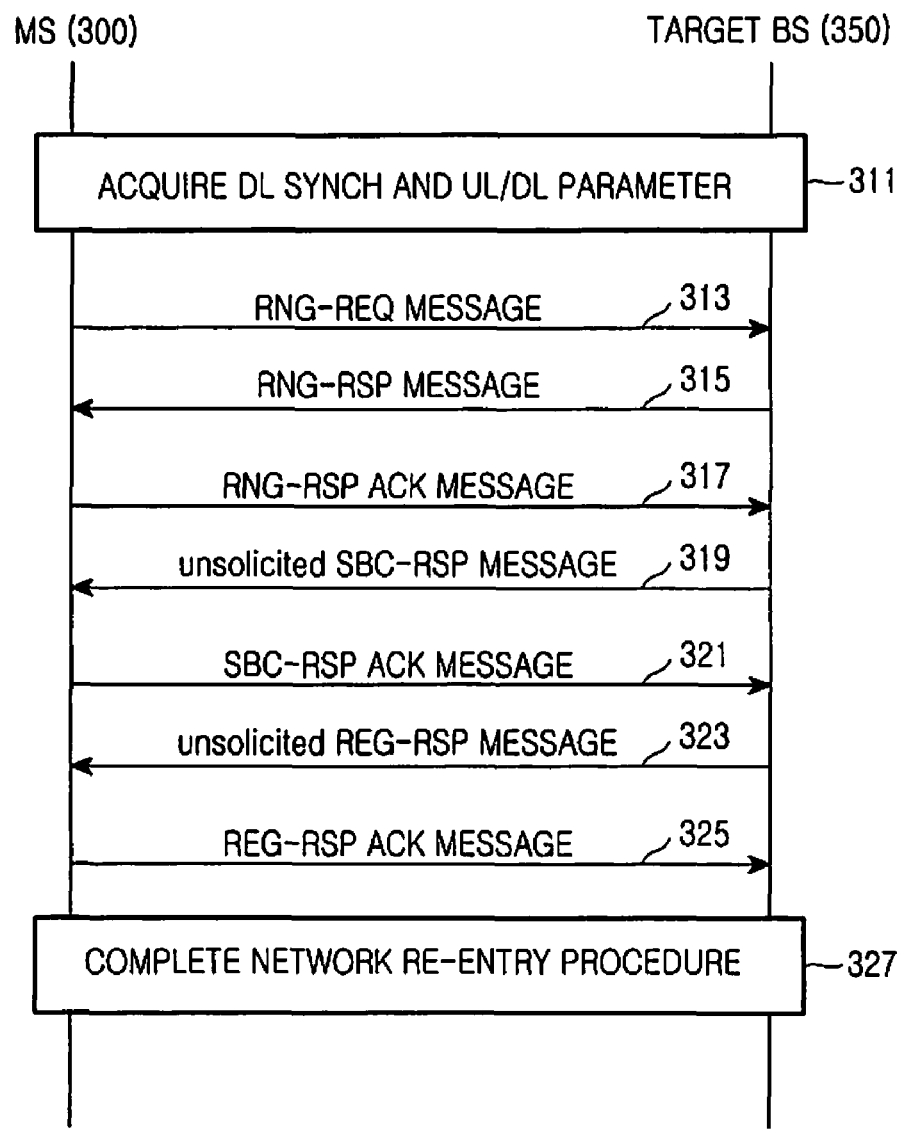
FIG. 3 is a signaling diagram illustrating a process of performing a network re-entry procedure based on HO Process Optimization TLV in an IEEE 802.16e communication system according to an embodiment of the present invention.

FIG. 3 is a signaling diagram illustrating a process of performing a network re-entry procedure based on HO Process Optimization TLV in an IEEE 802.16e communication system according to an embodiment of the present invention.

Referring to FIG. 3, after handover from a serving BS to a target BS 350, an MS 300 acquires downlink synchronization with the target BS 350, and receives parameters to be used in an uplink and a downlink, in step 311. The MS 300 sends a RaNGing REQuest (RNG-REQ) message to the target BS 350 in step 313, and the target BS 350 sends a RaNGing ReSPonse (RNG-RSP) message to the MS 300 in response to the RNG-REQ message in step 315. The RNG-RSP message includes HO Process Optimization TLV, and the HO Process Optimization TLV, an Information Element (IE) included using a TLV encoding scheme, is an IE of a handover-processed MS 300, used for supporting a fast network re-entry procedure with the target BS 350. That is, the HO Process Optimization TLV is an IE written to make it possible to omit some or all of the message transmission/reception processes that should necessarily be performed in the general network re-entry procedure for the fast network re-entry procedure of the MS 300. A detailed description of the HO Process Optimization TLV has been made in connection with Table 1 in the prior art section.

Upon receipt of the RNG-RSP message including the HO Process Optimization TLV from the target BS 350, the MS 300 sends an RNG-RSP ACKnowledge (ACK) message indicating normal receipt of the RNG-RSP message to the target BS 350 in step 317. The target BS 350, as it receives the RNG-RSP ACK message from the MS 300, recognizes that the MS 300 has normally received the RNG-RSP message.

The target BS 350 sends an unsolicited Subscriber Station Basic Capability ReSPonse (SBC-RSP) message to the MS 300 in step 319, even though it has not received from the MS 300 a Subscriber Station's Basic Capability Negotiation REQuest (SBC-REQ) message for negotiation of the basic capability of the MS 300.

Upon receipt of the unsolicited SBC-RSP message from the target BS 350, the MS 300 sends an SBC-RSP ACK message indicating normal receipt of the unsolicited SBC-RSP message, to the target BS 350 in step 321. The target BS 350, as it receives the SBC-RSP ACK message from the MS 300, recognizes that the MS 300 has normally received the SBC-RSP message.

The target BS 350 sends an unsolicited Registration ReSPonse (REG-RSP) message to the MS 300 in step 323, even though it has not received a Registration Request (REG-REQ) message from the MS 300. Upon receipt of the unsolicited REG-RSP message from the target BS 350, the MS 300 sends a REG-RSP ACK message indicating normal receipt of the unsolicited REG-RSP message to the target BS 350 in step 325.

The target BS 350, as it receives the REG-RSP ACK message from the MS 300, recognizes that the MS 300 has normally received the unsolicited REG-RSP message, completing the network re-entry procedure in step 327. As a result, as the MS 300 receives the unsolicited REG-RSP message, a normal operation is performed between the MS 300 and the target BS 350, completing the network re-entry procedure.

Although FIG. 3 has shown a case in which the target BS 350 sends the unsolicited SBC-RSP message and unsolicited RNG-RSP message according to the HO Process Optimization TLV, if the information included in the unsolicited SBC-RSP message and the unsolicited RNG-RSP message as described with reference to Table 2 is already included in the RNG-RSP message, the processes in steps 319 to 325 are not performed. In addition, although FIG. 3 has shown a case in which the target BS 350 sends the unsolicited SBC-RSP message and the unsolicited RNG-RSP message according to the HO Process Optimization TLV, the process may also include other message transmission/reception processes included in the network re-entry procedure, like the message transmission/reception process for Privacy Key Management (PKM) authentication according to the HO Process Optimization TLV.

The RNG-RSP ACK message, SBC-RSP ACK message, and REG-ESP ACK message can be implemented in the same format, i.e. can be implemented using a Network reentry confirm extended sub-header including a Network reentry confirm field, shown in Table 3 below.

TABLE 3

| Name | Size (bits) | Description |
|---|---|---|
| Network reentry confirm | 3 | Bit #0: set to 1 to indicate an acknowledgement for RNG-RSP message<br>Bit #1: set to 1 to indicate an acknowledgement for unsolicited SBC-RSP message<br>Bit #2: set to 1 to indicate an acknowledgement for unsolicited REG-RSP message |
| Reserved | 5 | Shall be set to zero |

As shown in Table 3, the Network reentry confirm field of the Network reentry confirm extended sub-header includes bitmap information indicating the message, upon receipt of which the MS transmits the current ACK message. That is, in the Network reentry confirm field, Bit#0=1 indicates that the MS transmits the current ACK message in response to the RNG-RSP message, Bit#1=1 indicates that the MS transmits the current ACK message in response to the unsolicited SBC-RSP message, and Bit#2=1 indicates that the MS transmits the current ACK message in response to the unsolicited REG-RSP message.

In addition, a Reserved field of the Network reentry confirm extended sub-header maintains the number of bits of the Network reentry confirm extended sub-header at 8, and is a field reserved for future use. For example, this field is set to '0'.

In transmitting ACK messages in response to the RNG-RSP message, unsolicited SBC-RSP message and unsolicited REG-RSP message, the MS sets bitmap information indicating the ACK messages for all of the RNG-RSP message, unsolicited SBC-RSP message and unsolicited REG-RSP message to transmit the ACK messages thorough one Network reentry confirm extended sub-header, or separately sets bitmap information indicating an ACK message for each of the RNG-RSP message, unsolicited SBC-RSP message and unsolicited REG-RSP message to transmit the ACK messages through three Network reentry confirm extended sub-headers.

In addition, the RNG-RSP ACK message, SBC-RSP ACK message and REG-ESP ACK message can be implemented using Reserved bits of a Channel Quality Information CHannel (CQICH) Allocation Request (CQICH Allocation Request) message header, shown in Table 4 below.

TABLE 4

| HT = 1 (1) | EC = 0 (1) | Type(3) = 0b111 | Feedback Type (3) | FBSS I (1) | Preferred-Period (3) | Network reentry confirm indicator (1) | Network reentry conform (3) |
|---|---|---|---|---|---|---|---|
| Reserved (8) | | | | CID MSB (8) | | | |
| CID LSB (8) | | | | HCS (8) | | | |

As shown in Table 4, the header of the CQICH Allocation Request message includes a Type field indicating a type of the currently transmitted header, a Fast BS Switching Indicator (FBSSI) field indicating that the MS transmits the header to request CQICH allocation when performing a Fast BS Switching (FBSS) operation, a Feedback Type field indicating a type for distinguishing the information for feeding back the CQICH, a Preferred-Period field indicating a CQICH allocation period preferred by the MS, a CID field indicating a Basic Connection IDentifier (CID) of the MS that transmits the header, an HCS field indicating a Header Check Sequence (HCS) used for checking defectlessness of the header, a Network reentry confirm indicator field indicating whether a Network reentry confirm field indicating transmission/non-transmission of an ACK for the RNG-RSP ACK message, SBC-RSP ACK message and REG-ESP ACK message during the network re-entry procedure is included in the header of the CQICH Allocation Request message, i.e. indicating that the header of the CQICH Allocation Request message is used for transmitting an ACK for the RNG-RSP ACK message, SBC-RSP ACK message and REG-ESP ACK message, and the Network reentry confirm field. In Table 4, if a value of the FBSSI field is set to '1', the Feedback Type field value and the Preferred. Period field value are ignored. A description will now be made of the bitmap information of the Network reentry confirm field.

Each bit of the Network reentry confirm field will first be described hereinbelow.

Bit#0=1 indicates an ACK message for the RNG-RSP message, Bit#1=1 indicates an ACK message for the unsolicited SBC-RSP message, and Bit#2=1 indicates an ACK message for the unsolicited REG-RSP message.

If the Network reentry confirm indicator field in the header of the CQICH Allocation Request message is set to '1', then the FBSSI field, Feedback Type field and Preferred-Period field in the header of the CQICH Allocation Request message are neglected.

In transmitting an ACK message in response to the RNG-RSP message, unsolicited SBC-RSP message and unsolicited REG-RSP message, the MS can set bitmap information indicating ACK messages for all of the RNG-RSP message, unsolicited SBC-RSP message and unsolicited REG-RSP message to transmit the ACK messages through one CQICH Allocation Request message header, or separately sets bitmap information indicating an ACK message for each of the RNG-RSP message, unsolicited SBC-RSP message and unsolicited REG-RSP message to transmit the ACK messages through three CQICH Allocation Request message headers.

The RNG-RSP ACK message, SBC-RSP ACK message and REG-ESP ACK message can be implemented using a header of a Bandwidth Request message, as shown in Table 5 below.

TABLE 5

| HT = 1 (1) | EC = 0 (1) | Type(3) = 0b000/0b001 | BR MSB (11) |
|---|---|---|---|
| BR LSB (8) | | | CID MSB (8) |
| CID LSB (8) | | | HCS (8) |

As shown in Table 5, the header of the Bandwidth Request message includes a Type field indicating a type of the currently transmitted header, a CID field indicating a Basic CID of the MS that transmits the header of the Bandwidth Request message, an HCS field indicating an HCS used for checking defectlessness of the header of the Bandwidth Request message, and a BR field.

If a value of the Type field is set to '000', it indicates whether a bandwidth allocation request of the MS is incremental, i.e. a value set later in the BR field indicates the bandwidth that the MS requests to be additionally allocated later. That is, if the value of the Type field is set to '000' and the BR field is set to '200', it indicates that the MS requests to be additionally allocated a bandwidth of 200.

If the value of the Type field is set to '001', it indicates whether the bandwidth allocation request is aggregate, i.e. a value set later in the BR field indicates the required full bandwidth that the MS should be allocated. That is, if the value of the Type field is set to '001' and the value of the BR field is set to '800', it indicates that a bandwidth of 800, determined by summing up the bandwidth the MS is allocated up to now and the bandwidth the MS will be allocated through the bandwidth allocation request, is allocated to the MS.

When transmitting the header of the Bandwidth Request message as an ACK message for the RNG-RSP message, unsolicited SBC-RSP message and unsolicited REG-RSP message in the network re-entry procedure, the MS sets a value of the BR field to '0'. Upon receipt of the header of the Bandwidth Request message with the BR field=0, the target BS that performs the network re-entry procedure with the MS recognizes the ACK message for the RNG-RSP message, unsolicited SBC-RSP message or unsolicited REG-RSP message.

Next, with reference to FIGS. 4A and 4B, a description will be made of an operation process of an MS in the network re-entry procedure based on the HO Process Optimization TLV in the IEEE 802.16e communication system according to an embodiment of the present invention.

Figure 4A:
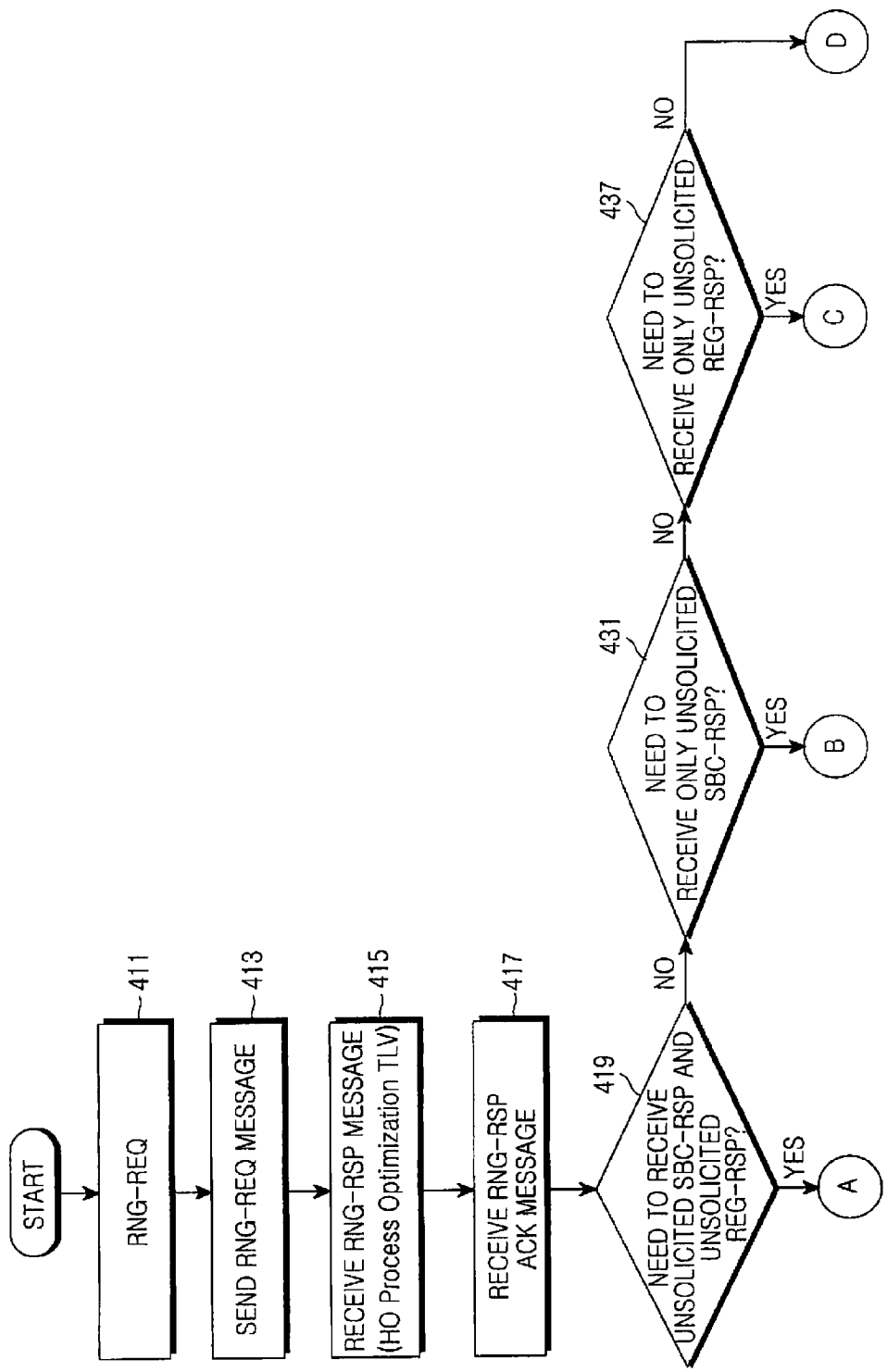
FIGS. 4A and 4B are flowcharts illustrating an operation process of an MS in a network re-entry procedure based on HO Process Optimization TLV in an IEEE 802.16e communication system according to an embodiment of the present invention.
Figure 4B:
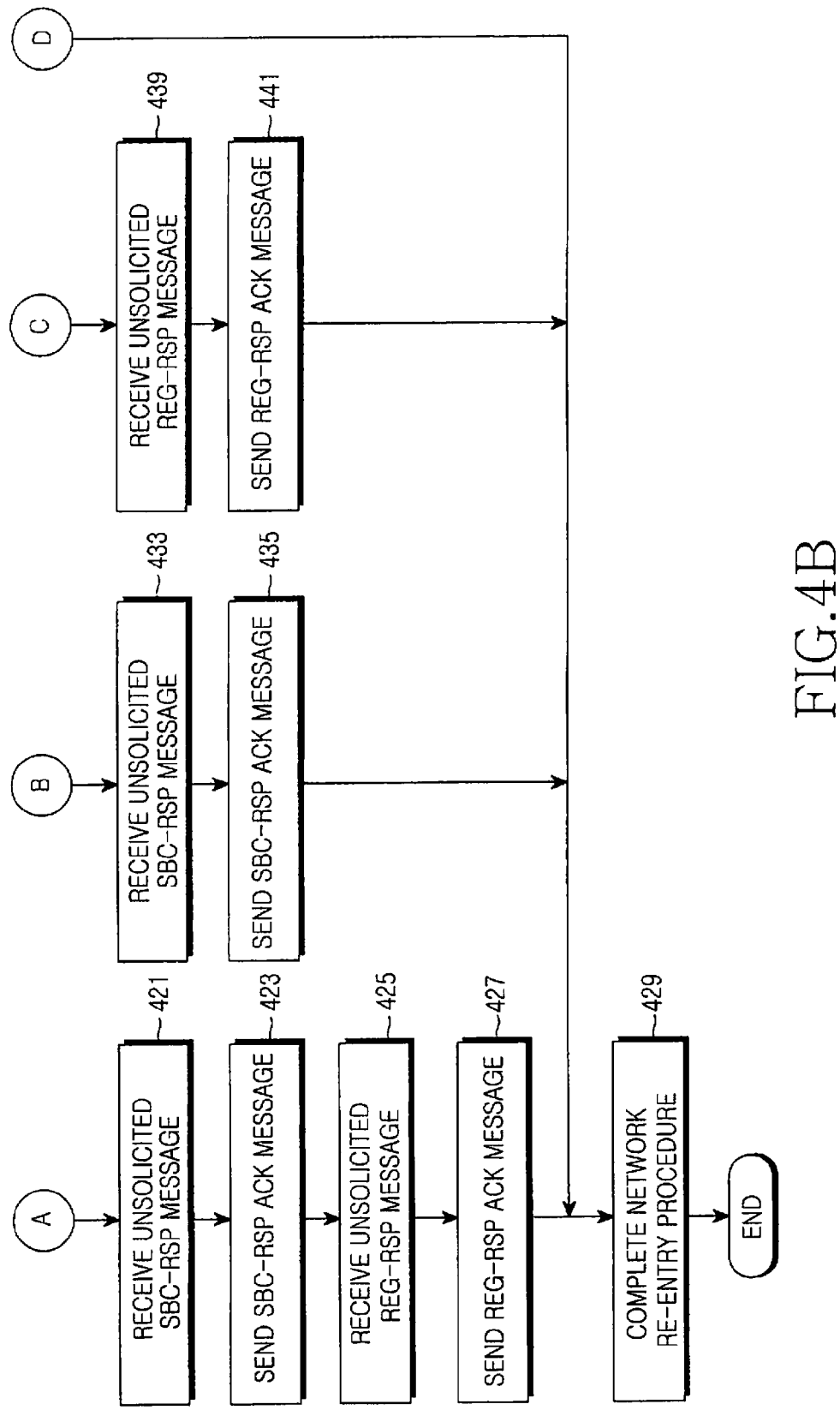

FIGS. 4A and 4B are flowcharts illustrating an operation process of an MS in a network re-entry procedure based on HO Process Optimization TLV in an IEEE 802.16e communication system according to an embodiment of the present invention.

Referring to FIGS. 4A and 4B, in step 411, an MS, after handover from a serving BS to a target BS, acquires downlink synchronization with the target BS, and receives parameters to be used in a downlink and an uplink. In step 413, the MS sends an RNG-REQ message to the target BS. In step 415, the MS receives an RNG-RSP message including HO Process Optimization TLV from the target BS in response to the RNG-REQ message. In step 417, the MS sends an RNG-RSP ACK message indicating normal receipt of the RNG-RSP message from the target BS. The RNG-RSP ACK message, as described with reference to Table 3 to Table 5, is implemented using the Network reentry confirm extended sub-header, Reserved bits of the CQICH Allocation Request message header, and the Bandwidth Request message header, and a detailed description thereof is given above.

In step 419, the MS analyzes the HO Process Optimization TLV received through the RNG-RSP message and determines whether there is a need to receive an unsolicited SBC-RSP message and an unsolicited REG-RSP message from the target BS. If it is determined that there is a need to receive the unsolicited SBC-RSP message and the unsolicited REG-RSP message from the target BS, the MS receives the unsolicited SBC-RSP message from the target BS in step 421. Thereafter, in step 423, the MS sends an SBC-RSP ACK message indicating normal receipt of the unsolicited SBC-RSP message to the target BS. The SBC-RSP ACK message, as described with reference to Table 3 to Table 5, is implemented using the Network reentry confirm extended sub-header, Reserved bits of the CQICH Allocation Request message header and the Bandwidth Request message header, and a detailed description thereof is given above.

In step 425, the MS receives the unsolicited REG-RSP message from the target BS. In step 427, the MS sends an REG-RSP ACK message indicating normal receipt of the unsolicited REG-RSP message to the target BS. The REG-RSP ACK message, as described with reference to Table 3 to Table 5, is complemented using the Network reentry confirm extended sub-header, Reserved bits of the CQICH Allocation Request message header and the Bandwidth Request message header, and a detailed description thereof is given above. In step 429, the MS completes the network re-entry procedure with the target BS, and then ends the operation process.

However, if it is determined in step 419 that there is no need to receive the unsolicited SBC-RSP message and the unsolicited REG-RSP message from the target BS, the MS determines in step 431 whether there is a need to receive only the unsolicited SBC-RSP message from the target BS. If there is a need to receive only the unsolicited SBC-RSP message from the target BS, the MS receives the unsolicited SBC-RSP message from the target BS in step 433. Thereafter, in step 435, the MS sends an SBC-RSP ACK message indicating normal receipt of the unsolicited SBC-RSP message to the target BS, and then proceeds to step 429.

However, if it is determined in step 431 that there is no need to receive only the unsolicited SBC-RSP message from the target BS, the MS determines in step 437 whether there is a need to receive only the unsolicited REG-RSP message from the target BS. If it is determined that there is a need to receive only the unsolicited REG-RSP message from the target BS, the MS receives the unsolicited REG-RSP message from the target BS in step 439. Thereafter, in step 441, the MS sends a REG-RSP ACK message indicating normal receipt of the unsolicited REG-RSP message to the target BS, and then proceeds to step 429.

However, if it is determined in step 437 that there is no need to receive only the unsolicited REG-RSP message from the target BS, i.e. if there is no more network re-entry procedure to perform other than the RNG-RSP message reception process according to the HO Process Optimization TLV, the target BS and the MS support a virtual SDU SN, and a value of Bit#6 of the HO Process Optimization TLV bitmap is set to '1', then the target BS allocates an uplink resource with which the MS can transmit an SN Report header, and the MS sends the SN Report header to the target BS using the uplink resource allocated from the target BS. In this case, the MS transmits the SN Report header without transmitting the ACK message having the format described with reference to Table 3 to Table 5, replacing the transmission of the ACK message for the RNG-RSP message. A format of the SN Report header is not directly related to the gist of the present invention, so a detailed description thereof will be omitted herein.

The operation process of the MS in the network re-entry procedure based on the HO Process Optimization TLV in the IEEE 802.16e communication system according to an embodiment of the present invention has been descried so far with reference to FIGS. 4A and 4B. Next, with reference to FIGS. 5A and 5B, a description will be made of an operation process of a target BS in a network re-entry procedure based on HO Process Optimization TLV in an IEEE 802.16e communication system according to an embodiment of the present invention.

Figure 5A:
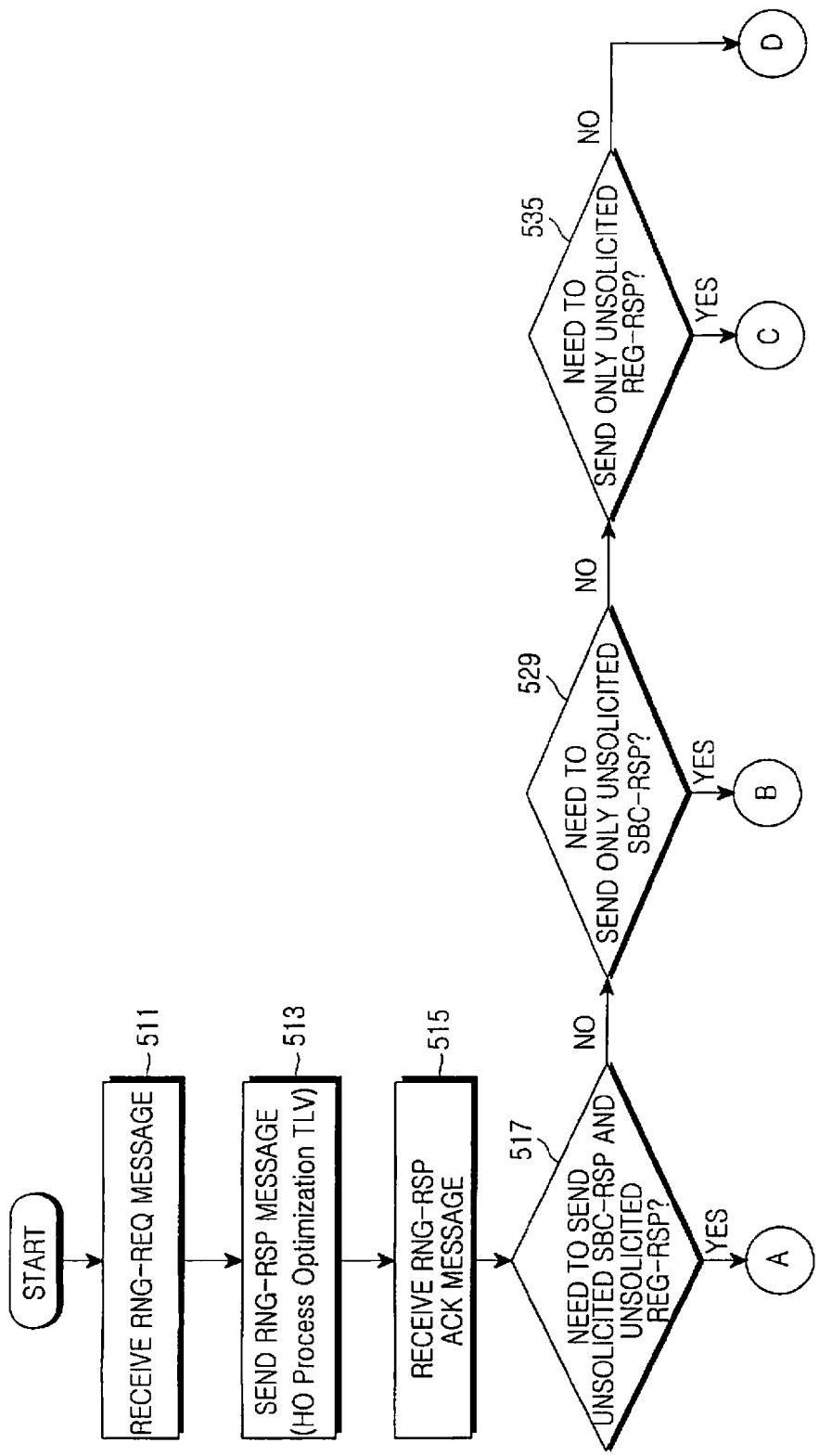
FIGS. 5A and 5B are flowcharts illustrating an operation process of a target BS in a network re-entry procedure based on HO Process Optimization TLV in an IEEE 802.16e communication system according to an embodiment of the present invention.
Figure 5B:
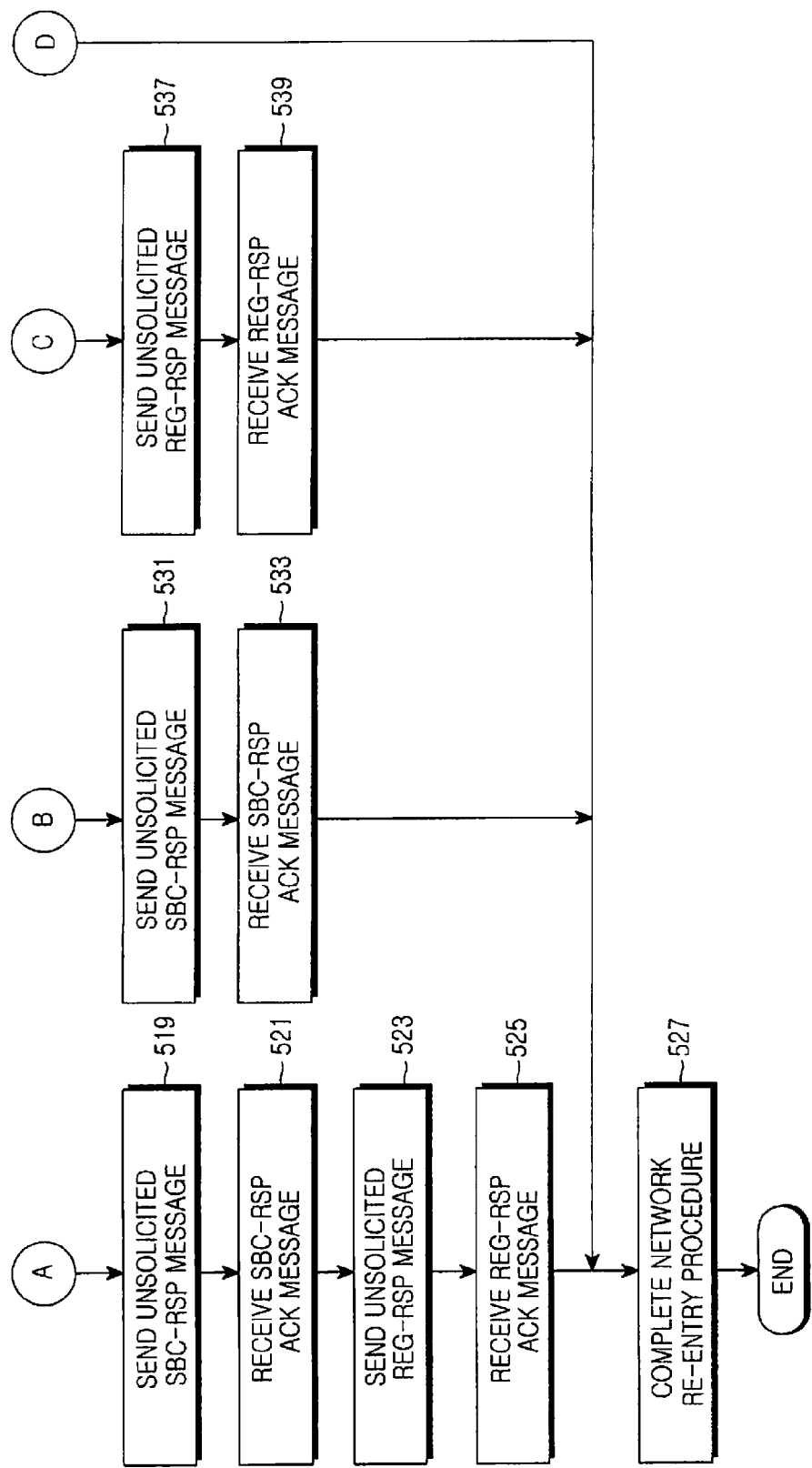

FIGS. 5A and 5B are flowcharts illustrating an operation process of a target BS in a network re-entry procedure based on HO Process Optimization TLV in an IEEE 802.16e communication system according to an embodiment of the present invention.

Referring to FIGS. 5A and 5B, in step 511, the target BS receives an RNG-REQ message from an MS. In step 513, the target BS sends an RNG-RSP message including HO Process Optimization TLV to the MS in response to the RNG-REQ message. In step 515, the target BS receives an RNG-RSP ACK message indicating normal receipt of the RNG-RSP message from the MS. The RNG-RSP ACK message, as described with reference to Table 3 to Table 5, is implemented using the Network reentry confirm extended sub-header, Reserved bits of the CQICH Allocation Request message header and the Bandwidth Request message header, and a detailed description thereof is given above.

In step 517, the target BS determines whether there is a need to transmit both of an unsolicited SBC-RSP message and an unsolicited REG-RSP message to the MS. If it is determined that there is a need to transmit both of the unsolicited SBC-RSP message and the unsolicited REG-RSP message to the MS, the target BS sends the unsolicited SBC-RSP message to the MS in step 519.

In step 521, the target BS receives an SBC-RSP ACK message indicating normal receipt of the unsolicited SBC-RSP message from the MS. The SBC-RSP ACK message, as described with reference to Table 3 to Table 5, is implemented using the Network reentry confirm extended sub-header, Reserved bits of the CQICH Allocation Request message header and the Bandwidth Request message header, and a detailed description thereof is given above.

In step 523, the target BS sends an unsolicited REG-RSP message to the MS. In step 525, the target BS receives an REG-RSP ACK message indicating normal receipt of the unsolicited REG-RSP message from the MS. The REG-RSP ACK message, as described with reference to Table 3 to Table 5, is implemented using the Network reentry confirm extended sub-header, Reserved bits of the CQICH Allocation Request message header and the Bandwidth Request message header, and a detailed description thereof is given above. In step 527, the target BS completes the network re-entry procedure with the MS, and then ends the operation process.

However, if it is determined in step 517 that there is no need to transmit both of the unsolicited SBC-RSP message and the unsolicited REG-RSP message to the MS, the target BS determines in step 529 whether there is a need to transmit only the unsolicited SBC-RSP message to the MS. If it is determined that there is a need to transmit only the unsolicited SBC-RSP message to the MS, the target BS sends the unsolicited SBC-RSP message to the MS in step 531. Thereafter, in step 533, the target BS receives an SBC-RSP ACK message indicating normal receipt of the unsolicited SBC-RSP message from the MS, and then proceeds to step 527.

However, if it is determined in step 529 that there is not need to transmit only the unsolicited SBC-RSP message to the MS, the target BS determines in step 535 whether there is a need to transmit only the unsolicited REG-RSP message to the MS. If it is determined that there is a need to transmit only the unsolicited REG-RSP message to the MS, the target BS sends the unsolicited REG-RSP message to the MS in step 537. Thereafter, in step 539, the target BS receives a REG-RSP ACK message indicating normal receipt of the unsolicited REG-RSP message from the MS, and then proceeds to step 527.

However, if it is determined in step 535 that there is no need to transmit only the unsolicited REG-RSP message to the MS, i.e. if there is no more network re-entry procedure to perform other than the RNG-RSP message reception process according to the HO Process Optimization TLV, the target BS and the MS support a virtual SDU SN, and a value of Bit#6 of the HO Process Optimization TLV bitmap is set to '1', then the target BS allocates an uplink resource with which the MS can transmit an SN Report header. Thereafter, the target BS receives the SN Report header that the MS transmits using the uplink resource allocated thereto. In this case, the target BS receives the SN Report header without receiving the ACK message having the format described with reference to Table 3 to Table 5, replacing the reception of the ACK message for the RNG-RSP message.

As can be understood from the foregoing description, in the communication system, when an MS performs a network re-entry procedure with a target BS after its connection switching to the target BS, the MS can send a notification indicating completion of the network re-entry procedure to the target BS, thereby preventing a possible delay from occurring between the MS and the target BS and improving the entire system performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for receiving a notification indicating completion of a network re-entry procedure by a base station (BS) in a communication system, the method comprising the steps of:
   transmitting, to a mobile station (MS), a Ranging Response (RNG-RSP) message including information indicating whether to omit any of processes or transmission of messages for performing a network re-entry procedure with the BS; and
   receiving, from the MS, a notification indicating completion of the network re-entry procedure,
   wherein the completion of the network re-entry procedure indicates that the MS receives, from the BS, the RNG-RSP message and completes the network re-entry procedure with the BS according to the information, and
   wherein the step of receiving, from the MS, a notification indicating completion of the network re-entry procedure comprises receiving, from the MS, a bandwidth request header with a zero bandwidth request field.

2. The method of claim 1, wherein, if the information indicates possibility of omitting all of the processes or transmission of messages necessary for performing the network re-entry procedure, the MS ends completing the network re-entry procedure with the BS upon receipt of the RNG-RSP message from the BS.

3. The method of claim 1, wherein if the information indicates at least one of the processes or transmission of messages is necessary for performing the network re-entry procedure, the MS notifies the completion of the network re-entry procedure to the BS after completing the at least one of the processes or transmission of messages necessary for performing the network re-entry procedure indicated in the information.

4. The method of claim 1, wherein if the information indicates at least one of the processes or transmission of messages is necessary for performing the network re-entry procedure, the MS ends completing the network re-entry procedure with a BS upon receipt of an unsolicited registration response (REG-RSP) message from the BS.

5. A system for receiving a notification indicating completion of a network re-entry procedure in a communication system, the system comprising:
   a base station (BS) for transmitting, to a mobile station (MS), a Ranging Response (RNG-RSP) message including information indicating whether to omit any of processes or transmission of messages for performing a network re-entry procedure with the BS, and receiving, from the MS, a notification indicating completion of the network re-entry procedure,
   wherein the completion of the network re-entry procedure indicates that the MS receives, from the BS, the RNG-RSP message and completes the network re-entry procedure with the BS according to the information, and
   wherein the receiving, from the MS, a notification indicating completion of the network re-entry procedure comprises receiving, from the MS, a bandwidth request header with a zero bandwidth request field.

6. The system of claim 5, wherein, if the information indicates possibility of omitting all of the processes or transmission of messages necessary for performing the network re-entry procedure, the MS ends completing the network re-entry procedure with the BS upon receipt of the RNG-RSP message from the BS.

7. The system of claim 5, wherein if the information indicates at least one of the processes or transmission of messages is necessary for performing the network re-entry procedure, the MS notifies the completion of the network re-entry procedure to the BS after completing the at least one of the processes or transmission of messages necessary for performing the network re-entry procedure indicated in the information.

8. The system of claim 5, wherein if the information indicates at least one of the processes or transmission of messages is necessary for performing the network re-entry procedure, the MS ends completing the network re-entry procedure with a BS upon receipt of an unsolicited registration response (REG-RSP) message from the BS.

* * * * *